Feb. 20, 1962     J. L. JENSEN     3,022,427
CONTROL APPARATUS

Filed Aug. 22, 1958     2 Sheets-Sheet 1

INVENTOR.
JAMES LEE JENSEN
BY *Omund R. Dahle*
ATTORNEY

United States Patent Office 3,022,427
Patented Feb. 20, 1962

3,022,427
CONTROL APPARATUS
James Lee Jensen, St. Louis Park, Minn., assignor to Minneapolis-Honeywell Regulator Company, Minneapolis, Minn., a corporation of Delaware
Filed Aug. 22, 1958, Ser. No. 756,726
1 Claim. (Cl. 307—57)

This invention relates to electrical generators operated in parallel and more particularly to apparatus for operating electrical generators in parallel. It has been ascertained that when a generator is incapable of delivering sufficient output power that a further generator or generators, operated in parallel with the first generator, will give the output power desired. However, when operating certain generators in parallel the problem is encountered of maintaining the control of each generator such that the load is shared by the plurality of generators. In my invention I disclose improved apparatus whereby each generator is controlled to provide a proportional amount of power.

An object of this invention is to provide semiconductor apparatus for operating electrical generators in parallel.

Another object of my invention is to provide apparatus for controlling the output currents of paralleled electrical generators.

A further object of this invention is to provide apparatus with current control and equalizer control for electrical generators operated in parallel. These and other objects of my invention will be understood upon consideration of the following specification, claim and drawings of which:

Figure 1:
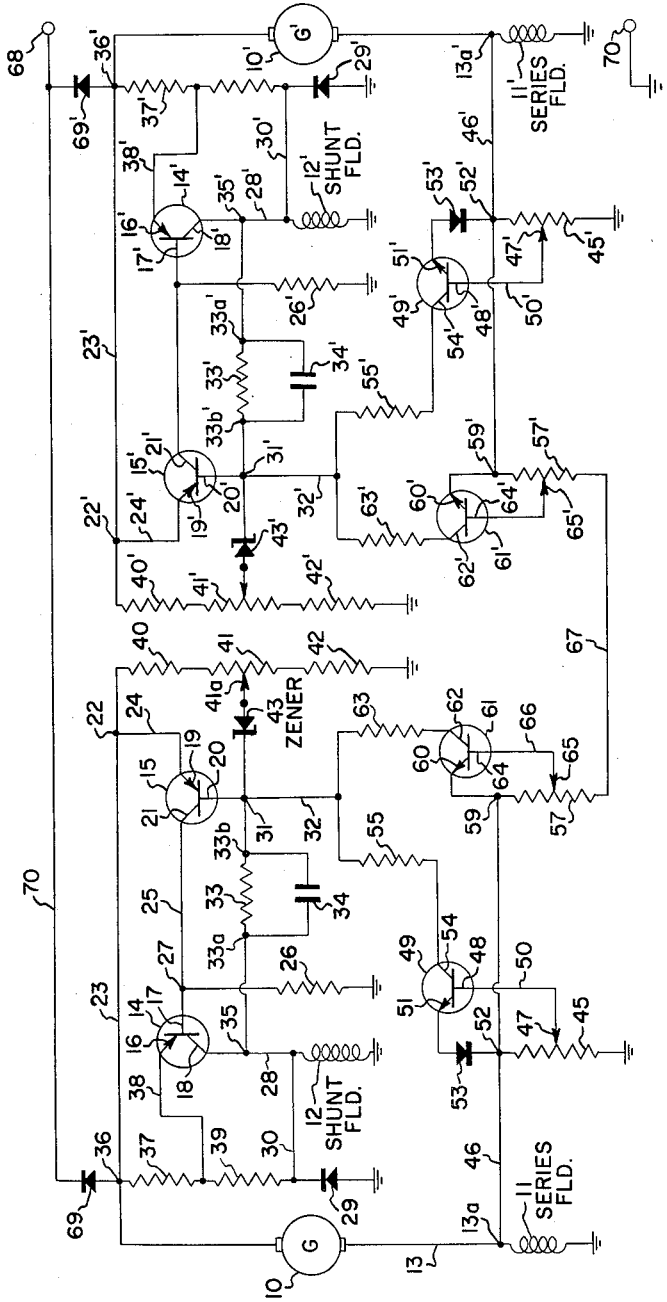
FIGURE 1 is a schematic diagram of an embodiment of my invention.
Figure 2:
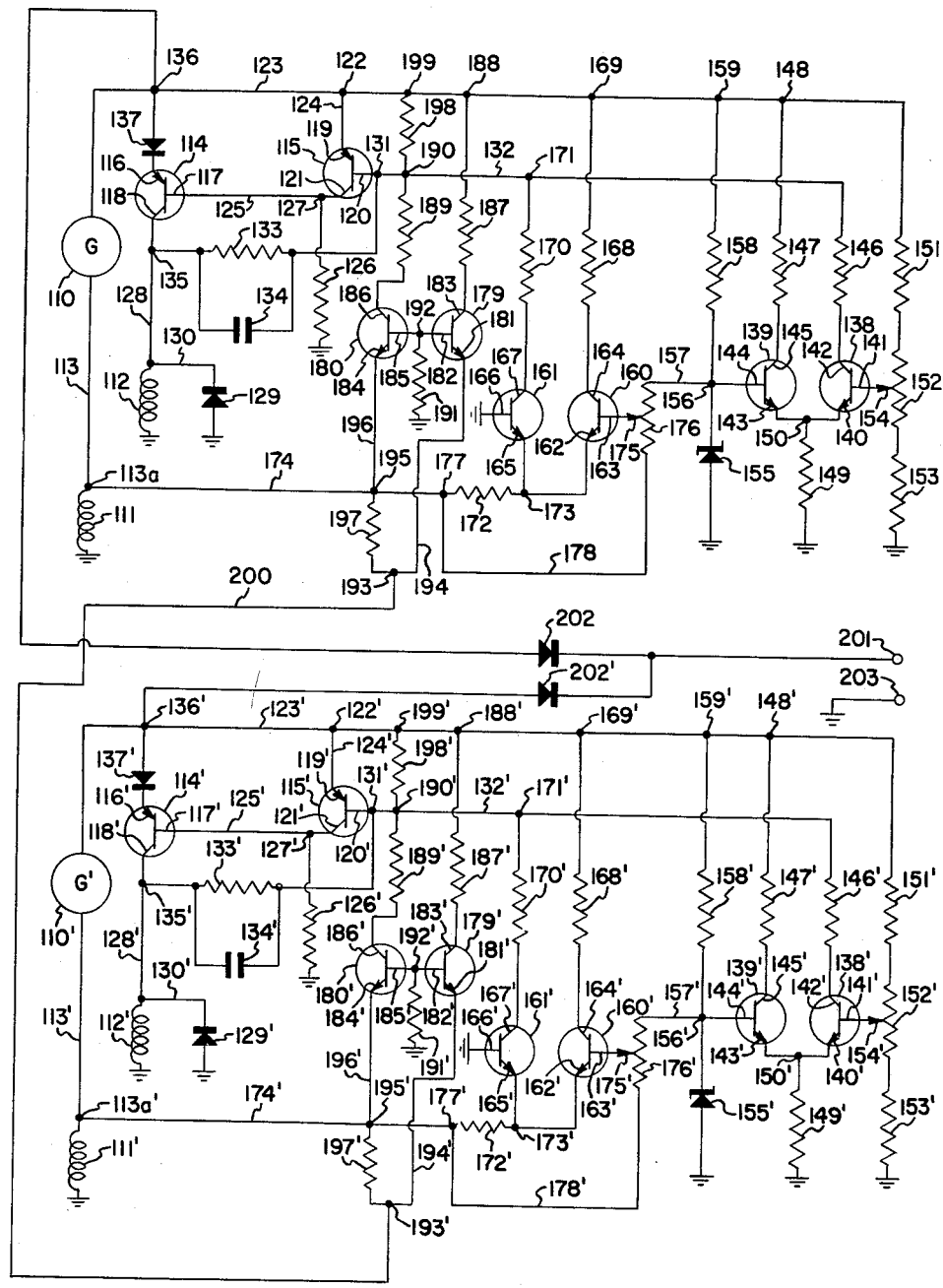
FIGURE 2 is a schematic diagram of another embodiment of my invention.

It can be seen upon inspection of FIGURES 1 and 2 that each figure is composed of two similar control circuits for generators. In describing my invention I shall discuss one of the circuits of each figure identifying the components by number, and in the identical second circuit of each figure the corresponding parts will carry the same numbers each followed by a prime mark. It will be understood that although control circuits for two parallel generators are shown, the invention is not limited to the control of only two generators.

Referring now to FIGURE 1 there is shown a generator 10 having a series field winding 11 and a shunt field winding 12. The armature of 10 is connected to the series field winding by a conductor 13. Semiconductor amplifying devices 14 and 15, her shown as PNP junction type transistors, comprise a switching circuit used to control the energization of the shunt field winding 12. Transistor 14 has an emitter electrode 16, a base electrode 17 and a collector electrode 18. Transistor 15 has an emitter electrode 19, a base electrode 20 and a collector electrode 21. A conductor 24, a junction 22, and a conductor 23 connects the emitter electrode 19 of transistor 15 to the output of generator 10 at a terminal 36. Collector electrode 21 of transistor 15 is directly connected to the base electrode 17 of transistor 14 by a conductor 25. A collector load resistor 26 is connected from ground to collector electrode 21 of transistor 15 at a junction 27 on conductor 25.

Collector electrode 18 of transistor 14 is directly connected to the ungrounded terminal of the generator shunt field winding 12, by a conductor 28. A transient damping diode 29 is connected in parallel with shunt field winding 12. The base electrode 20 of transistor 15 is directly connected to a junction 31 on a conductor 32. An RC network comprising a paralleled resistor 33 and a capacitor 34 is connected between the collector electrode 18 of transistor 14 and the base electrode 20 of transistor 15 at junctions 35 and 31. Emitter electrode 16 of transistor 14 is connected to the output terminal 36 of generator 10 by conductor 38 and resistor 37. A resistor 39 connects the emitter electrode 16 of transistor 14 to the ungrounded terminal of generator shunt field winding 12. A voltage divider network comprising resistors 40, 41 (potentiometer having an adjustable wiper arm 41a), and 42 is connected between the output of generator 10 and ground potential. A temperature compensated Zener potential reference diode 43 is directly connected between the wiper arm 41a of potentiometer 41 and base electrode 20.

A potentiometer resistor 45 which has one terminal grounded is connected in parallel with series field winding 11 by a conductor 46. An adjustable wiper arm 47 of potentiometer resistance 45 is connected to a base electrode 48 of an NPN junction type transistor 49 by a conductor 50. Transistor 49 also includes a collector electrode 54 and an emitter 51. Emitter electrode 51 is connected by a diode 53 to the conductor 46 at a junction 52. Collector electrode 54 is connected to base electrode 20 of transistor 15 by a collector load resistor 55.

A potentiometer resistor 57 has one terminal connected to the conductor 46 at junction 59. An emitter electrode 60 of an NPN junction type transistor 61 is directly connected to the conductor 46 at the junction 59. The transistor 61 also includes a collector electrode 62 and a base electrode 64. Collector electrode 62 is connected to base electrode 34 of transistor 15 by a collector load resistor 63. The base electrode 64 is connected by a conductor 66 to an adjustable wiper arm 65 of the potentiometer resistance 57.

A low impedance circuit connects the two identical control circuits together. This connection may be traced from the ungrounded terminal 13a of series field winding 11, through the conductor 46, the junction 59, the potentiometer 57, the conductor 67, the potentiometer 57′, and the conductor 46′ to the ungrounded terminal 13a′ of generator field winding 11. This low impedance circuit and the associated transistors 60 and 60′ perform the equalizing sensing and control.

The first control circuit is connected to the output terminal 68 by diode 69 and a conductor 70. An electrical load (not shown) which may include, for example, a battery to be charged, is connected between output terminals 68 and 71.

*Operation of FIGURE 1*

In considering the operation of the embodiment of my invention shown in FIGURE 1 it will be assumed that the generators 10 and 10′ are identical and supplying equal amounts of power to the output load. This assumption is made to facilitate the description of the operation of the circuit although this assumption need not necessarily be made. For example, it is possible to have two unsymmetrical generators operated in parallel whereby each generator provides a different amount of power to the output load. The operation of the embodiment shown in FIGURE 1 will be explained by considering the action of the control circuit when the output voltage, the output current, or the bus-bar current varies from a predetermined value.

Assume that initially the generators are each operating the predetermined value and the control circuit is in normal operating condition. This normal operating condition preferably is that in which transistor 14 is in the conductive state and transistor 15 is in a low or non-conductive state. It is to be understood that the description of the circuit with regards to the primed numbers will be similar to the description of the circuit containing the unprimed numbers. With transistor 14 in the conductive state and the generator output voltage and output current instantaneously at a predetermined level a current path may be traced from the positive output terminal 36 of generator 10, through emitter resistor 37, conductor 38, emitter to collector of transistor 14, and thence through the self-excited shunt field winding 12 to ground. If the generated output voltage should rise above the setpoint voltage between junction 22 and the wiper arm of potentiometer 41, the Zener diode 43 will become conductive and will thereby tend to render transistor 15 further conductive. With transistor 15 conducting a current flow may be traced from the output of generator 10 through conductor 23, junction 22, conductor 24 from the emitter 19 to collector 21 of transistor 15, through conductor 29, junction 27 and then through collector load resistor 26 to ground. The potential caused by the current flowing through the load resistance 26 is of sufficient magnitude to place the base 17 of transistor 14 at substantially cutoff potential and thereby tends to render transistor 14 non-conductive. With transistor 14 in the non-conductive state the current in shunt winding 12 will decrease and the output voltage of generator 10 will thereby decrease. The RC network comprising resistor 37 and capacitor 38 acts as a regenerative feedback path and enables a more rapid switching action to take place between transistors 14 and 15. The cycling action may be rapid and continuous. When the output voltage of generator 10 decreases to the desired level the potential between junction 22 and the wiper arm of variable resistor 41 will be insufficient to maintain transistor 15 in the proper conductive state and the cutoff potential at the base electrode 17 of transistor 14 will thereby be substantially removed. Upon removal of this potential, transistor 14 is once again conductive and energization to self-exciting shunt field winding 12 is again completed.

In considering the operation of the output current limiting circuit the total output current of each generator flows through the series field winding associated with each generator. The current flow through the series field winding produces a potential thereacross such that conductor 46 is negative with respect to the ground potential. The same potential appearing across the series field winding also appears across the potentiometer 45. A portion of the voltage appearing across the potentiometer, determined by the setting of wiper 47, is applied to the base electrode 48 of transistor 49. Under normal operating conditions the potential appearing between junction 52 and wiper 47 is of insufficient magnitude to maintain transistor 49 in the conductive state. Upon a sufficient increase of the current through series field 11 the potential of conductor 46 becomes more negative with respect to ground potential and the potential between junction 52 and wiper arm 47 increases to a sufficient magnitude to cause transistor 49 to be placed in the conductive state. With transistor 49 in the conductive state, sufficient current flows from the base electrode 20 through resistor 55 to collector 54 to turn on transistor 15. A current path may then be traced from the positive output terminal of generator 10 through conductor 23, junction 22, from the emitter to base of transistor 15, through conductor 32, collector load resistor 55, from collector to emitter of transistor 49, through diode 43, junction 52, and thence to the most negative point of the system, conductor 46.

With transistor 15 in the conductive state a current path may also be traced from the output terminal generator armature 10 through conductor 23, junction 22, conductor 24, from the emitter to collector of transistor 15, through conductor 25, junction 27, and then through collector load resistor 26. The current flowing through collector load resistor 26 is of sufficient magnitude to turn off transistor 14 and thereby remove the energization to shunt field winding 12. With the current in shunt field winding 12 decreasing the output current of generator 10 tends to decrease. Upon the reduction of the output current to a value below the desired limiting level, conductor 46 becomes less neagtive thereby reducing the bias to transistor 49. The reduction of bias turns off transistor 49 which tends to place transistor 15 in a lower conductive state. With transistor 15 in a lower conductive state transistor 14 is placed in the conductive state and the shunt field winding 12 is once more energized. This cycling action may be rapid and continuous.

In considering the equalizer control circuit contained in my invention it is to be noted that under the assumption of identical generators supplying equal current the potential at junction 13a is equal to the potential at junction 13a'. If the current through one of the generators should increase and the current through the other generator remain at the same level, the potential at the junction through which the current has increased will become more negative with respect to the junction through which the current flow has remained constant. For example, if the current through generator armature 10 increases and the current through generator 10' remains the same, junction 13a will then become negative with respect to junction 13a'. With junction 13a' positive with respect to junction 13a a current path may be traced from 13a' through conductor 46', the potentiometer 57', conductor 67, potentiometer 57, conductor 46, and then to junction 13a. The current flowing from junction 13a' to junction 13a results in a potential across potentiometer resistor 57' such that junction 59' is positive with respect to wiper arm 65'. This potential is of sufficient magnitude and polarity to maintain transistor 61' in the non-conductive state. The same current caused by the difference of potential between junction 13a' and junction 13a results in a potential between wiper arm 65 of potentiometer 57 and junction 59 such that junction 59 is negative with respect to wiper arm 65. This potential between junction 59 and wiper arm 65 is of a polarity to tend to place transistor 61 in the conductive state. With transistor 61 in the conductive state, sufficient current flows from base electrode 20 through resistor 63 to to collector 62 to place transistor 15 in the conductive state. With transistor 15 in the proper conductive state the collector current from transistor 15 is of sufficient magnitude to place a cut-off potential on junction 27 of sufficient magnitude to place transistor 14 in the non-conductive state. With transistor 14 in the non-conductive state the energization to shunt field winding 12 is removed and the current through generator 10 tends to decrease. As the current through generator 10 decreases toward the desired level, the potential at junction 13a changes in a less negative direction, and the current flowing through the equalizer bus decreases. When the potential difference between junction 13a' and junction 13a is reduced toward zero the potential between junction 59 and wiper arm 65 is of insufficient magnitude to maintain transistor 61 in the conductive state and the emitter current of transistor 61 will be substantially cutoff. When transistor 61 ceases to conduct it no longer maintains transistor 15 conductive. With transistor 15 in the non-conductive state, transistor 14 will be made conductive and shunt field winding 12 will once again be energized.

Although the operation of my invention has been described with reference to the control circuit for generator 10 it is clear that the same description of the operation applies also to the generator 10'. This does not mean that the several control circuits are operating exactly the same at all times since under conditions of unbalance the several control circuits must operate differently in order to maintain the difference in output between the parallel generator at a minimum. The voltage, current and equalization circuits as described above, are each effective to control the conductivity of transistor 14 and thus the excitation of the generator.

*FIGURE 2*

The embodiment of my invention shown in FIGURE 2 consists of two similar control circuits for generators operated in parallel. The upper control circuit elements and generator will be enumerated in unprimed numbers and the elements in the low control circuit and generator will be enumerated with primed numbers. It is to be understood that like numbers stand for like components. The operation of the parallel system can be understood upon the description of one of the control circuits and generators associated therewith and the description shall be made with reference to the control circuit and generator contraining unprimed numbers.

In FIGURE 2 there is shown a generator 110 having a series field winding 111 and a self-excited shunt field winding 112. The generator 110 is connected to one terminal of the series field winding 111 by a conductor 113. The other terminal of the field winding is grounded. Transistors 114 and 115, shown as PNP junction type transistors, form a bistable switching arrangement. Transistor 114 has emitter electrode 116, a base electrode 117, and collector electrode 118. Transistor 115 has an emitter electrode 119, a base electrode 120, and a collector electrode 121. Emitter electrode 119 of transistor 115 is connected to the output of generator 110 at the terminal 136. A conductor 125 connects the base electrode 117 of transistor 114 to the collector electrode 121 of transistor 115. A collector load resistor 126 is connected from ground to the collector electrode 121 of transistor 119 at a junction 127 on conductor 125. A conductor 128 connects the collector electrode 118 of transistor 114 to one terminal of the generator shunt field exciting winding 112, the other winding terminal being grounded. A transient damping diode 129 is connected in parallel with the shunt field winding. Base electrode 120 of transistor 119 is connected to a conductor 132. An RC network comprising a paralleled resistor 133 and a capacitor 134 is connected between the collector electrode 118 of transistor 114 and base electrode 120 of transistor 115 at junctions 135 and 131 respectively. The emitter electrode 116 of transistor 114 is connected to generator terminal 136 by a rectifying diode 137.

A pair of NPN junction type transistors 138 and 139 form a first differential detector utilized for generator voltage control. Transistor 138 has an emitter electrode 140, a base electrode 141, and a collector electrode 142. NPN type junction transistor 139 has an emitter electrode 143, a base electrode 144, and a collector electrode 145. A collector load resistor 146 has one lead directly connected to emitter electrode 142 of transistor 138 and the other lead connected to the base electrode 120 of transistor 115 by the conductor 132. A collector load resistor 147 has one lead directly connected to collector electrode 145 of transistor 139 and the other lead is connected to a junction 148 on generator output conductor 123. Emitter electrodes 140 and 143 of transistors 138 and 139, respectively, are connected to one terminal of a common emitter resistor 149 at a junction 150. The other lead of emitter resistor 149 is connected to ground potential. Series connected resistors 151, 152, and 153 form a voltage divider network connected between the output of generator 110 and ground potential. The resistor 152 is of the potentiometer type and has an adjustable wiper contact 154. Base electrode 141 of transistor 138 is directly connected to the wiper arm 154. A reference voltage which may be in the form of a Zener diode 155 is connected to the base electrode 144 of transistor 139 at a junction 156 on a conductor 157. A resistor 158 is directly connected between a junction 159 on the output conductor 123 and the base electrode 144 of transistor 139. The Zener diode provides a reference bias potential to the base of transistor 139.

Transistors 160 and 161 form a second differential detector utilized in generator current control. Transistor 160 has an emitter electrode 162, a base electrode 163 and a collector electrode 164. Transistor 161 has an emitter electrode 165, a base electrode 166, and a collector electrode 167. Collector load resistor 168 has one lead connected to the collector electrode 164 of transistor 160 and the other lead connected to a junction 169 on the output conductor 123. Collector load resistor 170 has one lead directly connected to the collector electrode 167 of transistor 161 and the other lead is connected to the conductor 132 at a junction 171. Emitter electrodes 162 and 165 of transistors 160 and 161, respectively, are directly connected to one lead of a common emitter resistor 172 at a junction 173. The other terminal 177 of resistor 172 is directly connected to the junction 113a by a conductor 174. The base electrode 163 of transistor 160 is directly connected to the wiper arm 175 of a potentiometer 176. One terminal of the potentiometer 176 is directly connected to the conductor 157 and the other terminal of the potentiometer 176 is connected to the conductor 174 at the terminal 177 by a conductor 178. The base electrode 166 of transistor 161 is connected directly to ground potential.

Transistors 179 and 180, which may be of the NPN junction type transistor, form a third differential detector. Transistor 179 has an emitter electrode 181, a base electrode 182, and a collector electrode 183. Transistor 180 has an emitter electrode 184, a base electrode 185, and a collector electrode 186. A collector load resistor 187 has one lead directly connected to the collector electrode 183 of transistor 179 and the other lead connected to the conductor 123 at a junction 188. A collector load resistor 189 has one lead directly connected to collector electrode 186 of transistor 180 and the other lead connected to the conductor 132 at a junction 190. The base electrodes 182 and 185 of transistors 179 and 180, respectively, are connected to one lead of a common base resistor 191 at a junction 192. The other lead of base resistor 191 is directly connected to ground. The emitter electrode 181 of transistor 179 is directly connected to a junction 193 by a conductor 194. The emitter electrode 184 of transistor 180 is directly connected to a junction 195 on the conductor 174 by a conductor 196. A resistor 197 is directly connected between junctions 195 and 193. A resistor 198 is directly connected between a junction 190 on the conductor 132 and a junction 199 on the conductor 123.

The control circuit for generator 110 is connected to the control circuit for generator 110' by a conductor 200 which extends from junction 193 to junction 193'. The output of generator 110 is connected to output terminal 201 by a diode 202. A load (not shown) is connected between output terminal 201 and grounded output terminal 203.

*Operation of FIGURE 2*

In considering the operation of the embodiment of my invention shown in FIGURE 2 it will be assumed that generators 110 and 110' are identical generators and each is delivering an equal amount of power to the output load. This assumption is made to facilitate the explanation of the operation of the circuit but it is to be understood that this embodiment of my invention will operate with the controls adjusted to cause generators 110 and 110' to provide unequal amounts of power to the output load. The embodiment shown in FIGURE 2 will be discussed with reference to the control circuit for generator 110 and it is to be understood that the control circuit for generator 110' operates in a similar manner.

Assume that initially generators 110 and 110' are delivering equal amounts of output power and that the output voltage, output current, and output power is at a predetermined level. Under the assumption that the circuit is in the normal operating condition transistor 114 will be in the conductive state and transistor 115 will be in the substantially non-conductive state. With transistor 114 in the conductive state a current path may be traced from the positive terminal of generator 110, through conductor 123, junction 136, diode 137, from the emitter to collector of transistor 114, through conductor 128, and then through shunt field winding 112, to ground. With the generator supplying normal output voltage to the output load the voltage differential detector comprising transistors 138 and 139 may be operated in such a manner that each transistor conducts a substantially equal amount of current. The voltage divider network comprising resistors 151, 152, and 153 provides a potential between the wiper arm 154 of potentiometer 152 and reference potential point 156 representative of the output potential of the generator.

It is to be noted that the potential appearing between junction 156 and ground potential is of a substantially constant magnitude due to Zener reference diode 155. If the output voltage of generator 110 should rise above the desired level the magnitude of the potential between wiper arm 154 and ground potential increases. Since the current flowing through common emitter resistor 149 is of a substantially constant value in differential detectors, the effect of the increase in output voltage of generator 110 is to tend to increase the conduction of transistor 138 and simultaneously decrease the conduction of transistor 139 by a substantially equal amount. An increase in conduction of transistor 138 causes an increase in the current flowing through the path comprising the output terminal of generator 110, conductor 123, junction 199, resistor 198, junction 190, conductor 132, collector load resistor 146, from the collector to emitter of transistor 138, through emitter resistor 149 and thence to the ground. The increased current flow through this path increases the bias to transistor 115 to increase the conduction therein. With transistor 115 in the conductive state a current path may be traced from the positive terminal of generator 110 through the conductor 123, junction 122, from the emitter to collector of transistor 115, conductor 125, junction 127, and then through collector load resistor 126 to ground. The current flow through collector load resistor 126 places a potential on junction 127 of such polarity and magnitude as to reduce the bias of transistor 114 to render transistor 114 non-conductive. With transistor 114 in a non-conductive state, energization of shunt field exciting winding 112 is reduced and the output voltage of generator 110 decreases.

The RC network comprising resistor 133 and capacitor 134 provides a regenerative feedback from collector 118 to base 131 and aids the switching action of bistable transistors 114 and 115. Transistor 114 will remain in a non-conductive state until such time as the output voltage generator 110 decreases to the desired value, at which time the potential appearing between wiper arm 154 and ground potential decreases and the current flowing through transistor 138 also decreases. When the current flowing through transistor 138 decreases to a predetermined value the potential appearing between junctions 199 and 190 is of insufficient magnitude to maintain transistor 115 in the conductive state and the circuit may revert to the normal operating condition, i.e. transistor 114 in the conductive state. With transistor 114 in the conductive state energization of self-excited shunt field winding 112 once again increases. The switching action which may be rapid and continuous is effective to maintain the generator voltage at the desired level.

Output current limiting of generator 110 is attained by utilizing the differential detector comprising transistors 160 and 161. Under normal operating conditions it may be assumed that transistors 160 and 161 each supply a substantially equal amount of current to the common emitter resistor 172. A current path for transistor 160 comprises the following path: from the positive output terminal of generator 110 through conductor 123, junction 169, collector load resistor 168, from the collector to emitter of transistor 160, through emitter resistor 172, through conductor 174 and then to terminal 113a. A current path for transistor 161 may be traced from the positive output terminal of generator 110, through conductor 123, junction 199, resistor 198, junction 190, conductor 132, junction 171, collector load resistor 170, from the collector to emitter of transistor 161, through common emitter resistor 172, conductor 174, and then to junction 113a.

An increase in the output current of generator 110 toward the desired limiting level makes junction 113a more negative with respect to ground potential. The increased negative potential at junction 113a causes an increased negative potential at junction 177 which has the net effect of increasing the conduction of transistor 161 and reducing the conduction of 160. This can be seen by observing that the base of transistor 161 is maintained at a constant ground potential while the emitter of transistor 161 has become effectively more negative. The increase in negative potential at junction 177 has the effect of decreasing the conduction of transistor 160 since the base electrode 163 of transistor 160 is effectively placed at a less positive potential with respect to the emitter electrode 162. Because of an increased conduction of transistor 161 there will be an increased current flow through resistor 198 which, at the current limiting point, will provide a potential between junctions 199 and 190 of a direction and magnitude to place transistor 115 in the conductive state and turn off transistor 114. With transistor 114 in the non-conductive state energization of self-excited shunt field winding 112 is reduced and the output current of generator 110 is decreased. Upon a reduction of the output current of generator 110 the potential of junction 113a becomes less negative with respect to ground potential and junction 177 thereby also become less negative with respect to ground potential, such that the conduction of transistor 161 decreases and thereby causes a smaller bias current to the switching circuit so that the circuit switches back to the initial condition and re-energization of self-excited shunt field winding 112 occurs. As long as the point of current limiting tends to be exceeded the switching circuit will cycle to reduce the excitation to the generator.

In considering the operation of the equalizer bus-bar control circuit it can be appreciated from the preceding discussion that under the assumption of identical generators and identical elements within the control circuits that the potential at junction 113a' is substantially equal to the potential at junction 113a under normal operating conditions. As explained previously with reference to FIGURE 1, if the output currents of the generators become unbalanced then the potential at the junction through which the current has increased becomes more negative with respect to the other junction. Assume, for example, that the current through generator 110 has increased above the desired level with respect to generator 110'. Under this assumption junction 113a becomes negative in respect to junction 113a' and a current path may be traced from 113a' through conductor 174', junction 195', resistor 197', junction 193', conductor 200, junction 193, resistor 197, junction 195, conductor 174, and then to the most negative potential point in the system, i.e. junction 113a.

It can be seen that the transistors 179 and 180 form a differential amplifier. It will be assumed that under normal operating conditions each of these transistors conduct an equal amount of current. However, under the assumption that the output current of generator 110 is increased, the current which flows from junction 113a' to junction 113a causes a potential drop across resistors 197 and 197'. The potential across resistor 197 tends to reduce the conduction of transistor 179 and increase the conduction of transistor 180. A current path through transistor 180 may be traced from the positive output terminal of generator 110 through conductor 123, junction 199, resistor 198, junction 190, resistor 189, from the collector to emitter of transistor 180, through conductor 196, junction 195, conductor 174 and then to junction 113a. This increase in the current flowing through transistor 180 causes increased conduction of transistor 115 to place transistor 114 in the non-conductive state, whereby energization of shunt field winding 112 is reduced. Upon a reduction of the output current of generator 110 to the desired level the potential of junction 113a tends to equalize with that of junction 113a' and the current flowing through resistor 197 is effectively removed, so that transistor 114 may therefore again become conductive. With transistor 114 now in a conductive state energization to shunt field winding 112 is restored.

It is known that the temperature variations cause transistors to have a tendency to shift their operating point. A shift in the operating point of the transistors creates the undesirable effect of varying the set point of the circuit. The embodiment of my invention shown in FIGURE 2, wherein differential detector circuits are utilized, effectively eliminates the problem of variation in set point encountered with the use of single transistors. Since the transistors forming each differential detector circuit are substantially identical, the shift in transistor characteristics for each transistor would be substantially equal and the operating point of the control circuit would thereby be effectively stabilized.

While I have shown only the specific embodiments of my invention, it is obvious to those skilled in the art that certain changes may be made in the circuitry of these embodiments without departing from the spirit of the invention. With this in mind, I wish to be limited only by the scope of the appended claim.

I claim as my invention:

The combination of generators operating in parallel and control circuits associated therewith: each of said control circuits comprising, semiconductor switching means having input and output terminals, the output terminals of said switching means being connected in circuit with and operative to control the energization of an associated generator, output voltage comparison means including first semiconductor detection means, said detection means being connected in controlling relation to said switching means, output current sensing means including second semiconductor detection means, the output of said detection means being connected in circuit with and operative to actuate said switching means; means connecting said plurality of generators to a common load; and further semiconductor differential detection means connected to sense the output currents of all of said generators, said detection means being responsive to the output current differential of said plurality of generators and being connected to said semiconductor switching means input terminals associated with each of said generators and operative to selectively actuate said switching means in response to unbalance in the outputs of said generators thereby enabling said control circuits to compel said generators to control and distribute the output load in a predetermined manner.

References Cited in the file of this patent

UNITED STATES PATENTS

| | | |
|---|---|---|
| 2,158,880 | Mathews | May 16, 1949 |
| 2,760,083 | Rau et al. | Aug. 21, 1956 |
| 2,800,594 | Wellington et al. | July 23, 1957 |
| 2,859,356 | King | Nov. 4, 1958 |
| 2,859,357 | Schmeling | Nov. 4, 1958 |
| 2,859,358 | King | Nov. 4, 1958 |
| 2,887,641 | Scharstein et al. | May 19, 1959 |